(12) United States Patent
Clark et al.

(10) Patent No.: US 10,399,870 B2
(45) Date of Patent: Sep. 3, 2019

(54) WATER TREATMENT SYSTEM

(71) Applicant: B. BRAUN AVITUM AG, Melsungen (DE)

(72) Inventors: Chris Clark, Nottinghamshire (GB); James Steptoe, Bridgend (GB); Björn Bröker, Staufenberg (DE)

(73) Assignee: B. Braun Avitum AG (DE)

( * ) Notice: Subject to any disclaimer, the term of this patent is extended or adjusted under 35 U.S.C. 154(b) by 58 days.

(21) Appl. No.: 15/896,181

(22) Filed: Feb. 14, 2018

(65) Prior Publication Data

US 2018/0251385 A1    Sep. 6, 2018

(30) Foreign Application Priority Data

Mar. 6, 2017  (EP) ..................................... 17159395

(51) Int. Cl.
 *C02F 1/44*  (2006.01)
 *C02F 1/42*  (2006.01)
  (Continued)

(52) U.S. Cl.
 CPC ............ *C02F 1/441* (2013.01); *B01D 15/203* (2013.01); *B01D 24/46* (2013.01); *B01D 61/025* (2013.01);
  (Continued)

(58) Field of Classification Search
 CPC ............ B01D 2311/04; B01D 2311/08; B01D 2311/25; B01D 2311/2649;
  (Continued)

(56) References Cited

U.S. PATENT DOCUMENTS

| | | |
|---|---|---|
| 5,451,314 A | 9/1995 | Neuenschwander |
| 2005/0126999 A1 | 6/2005 | Rawson et al. |
| 2017/0001883 A1 | 1/2017 | Yoshikawa et al. |

FOREIGN PATENT DOCUMENTS

| | | |
|---|---|---|
| EP | 0676374 A1 | 10/1995 |
| EP | 0676375 A2 | 10/1995 |

(Continued)

OTHER PUBLICATIONS

Extended European Search Report for European Application No. 17159395.7, dated Aug. 17, 2017, 8 pages.

(Continued)

*Primary Examiner* — Dirk R Bass
(74) *Attorney, Agent, or Firm* — RatnerPrestia

(57) ABSTRACT

A water treatment system is provided, including a raw water tank connected to a water supply, a reverse osmosis unit arranged to produce purified water from water input from the raw water tank via a raw water supply line, at least one water treatment facility alongside the raw water supply line downstream of the raw water tank and upstream of the reverse osmosis unit, and a reuse water feedback line arranged to feed waste water and/or grey water collected from the reverse osmosis unit and/or the at least one water treatment facility back to the raw water tank for reuse. In a water treatment method in such a water treatment system, waste water and/or grey water collected from the reverse osmosis unit and/or the at least one water treatment facility is fed back to the raw water tank for reuse.

11 Claims, 1 Drawing Sheet

(51) Int. Cl.
  *C02F 1/28* (2006.01)
  *C02F 1/00* (2006.01)
  *B01D 15/20* (2006.01)
  *B01D 24/46* (2006.01)
  *B01D 61/02* (2006.01)
  *B01D 61/04* (2006.01)
  *B01D 61/10* (2006.01)

(52) U.S. Cl.
  CPC ............ *B01D 61/04* (2013.01); *B01D 61/10* (2013.01); *C02F 1/006* (2013.01); *C02F 1/008* (2013.01); *C02F 1/281* (2013.01); *C02F 1/283* (2013.01); *C02F 1/42* (2013.01); *B01D 2311/04* (2013.01); *B01D 2311/08* (2013.01); *C02F 1/001* (2013.01); *C02F 2001/425* (2013.01); *C02F 2301/04* (2013.01); *C02F 2301/046* (2013.01); *C02F 2303/10* (2013.01); *C02F 2303/16* (2013.01)

(58) Field of Classification Search
  CPC ............ B01D 2311/268; B01D 15/203; B01D 24/46; B01D 61/025; B01D 61/04; B01D 61/10; C02F 1/001; C02F 1/006; C02F 1/008; C02F 1/281; C02F 1/283; C02F 1/42; C02F 1/441; C02F 2001/425; C02F 2301/04; C02F 2301/046
  See application file for complete search history.

(56) References Cited

FOREIGN PATENT DOCUMENTS

| EP | 2644572 A1 | 10/2013 | |
|---|---|---|---|
| GB | 2500685 | * 5/2012 | ............ C02F 1/44 |
| JP | 11244852 A | 9/1999 | |
| JP | 200126767 A | 5/2000 | |
| JP | 2012217975 A | 11/2012 | |

OTHER PUBLICATIONS

Mavrov et al., "Desalination of Surface Water to Industrial Water with Lower Impact on the Environment. Part 1: New Technological Concept", Desalination vol. 108, 1996, pp. 159-166.

* cited by examiner

WATER TREATMENT SYSTEM

CROSS REFERENCE TO RELATED APPLICATIONS

This application claims priority to European application EP 17159395.7 filed Mar. 6, 2017, the contents of such application being incorporated by reference herein.

FIELD OF THE INVENTION

The invention relates to a water treatment system including system parts or an apparatus and a method for water reuse in a water purification system comprising a reverse osmosis unit, and in particular concerns reusing water from carbon backwash and/or reverse osmosis discharge in such apparatus and method.

BACKGROUND OF THE INVENTION

Reverse osmosis (RO) is a water purification technology that uses a semipermeable membrane to remove ions, molecules, and larger particles from e.g. tap water. In reverse osmosis, an applied pressure is used to overcome osmotic pressure, a colligative property, that is driven by chemical potential differences of the solvent, a thermodynamic parameter. Reverse osmosis can remove many types of dissolved and suspended species from water by retaining the solute on the pressurized side of the membrane and allowing the pure solvent to pass to the other side. The membrane is sort of selective in that large molecules or ions are not allowed through the pores (holes), but smaller components of the solution (such as solvent molecules) are allowed to pass freely.

The process of reverse osmosis can be used for the production of deionized water. Deionized water is water that has had almost all of its mineral ions removed, such as cations like sodium, calcium, iron, and copper, and anions such as chloride and sulfate. Deionization is a chemical process that uses specially manufactured ion-exchange resins, which exchange hydrogen and hydroxide ions for dissolved minerals, and then recombine to form water. Because most non-particulate water impurities are dissolved salts, deionization produces a high purity water that is generally similar to distilled water, and this process is quick and without scale buildup.

In, for example, dialysis treatment dialysis machines need deionized water to ensure correct composition of dialysis fluid. Therefore, dialysis center usually process tap water by softeners, carbon filter and a reverse osmosis processing unit. Such systems usually have a gain of just 30% and the remaining water is considered waste water (grey water) as it has been used in the system for a process or has an increased concentration of ions (mostly sodium). Reusing this fluid is uncommon due to the higher amount of diluted sodium and/or it being considered waste water as it has been used in the system.

As the processing of dialysis fluid involves high water consumption, the inventor analyzed the water consumption of the water purification system and found that only part of the input water is processed into purified water, with a high proportion and significant remainder of water being finally drained.

DESCRIPTION OF THE RELATED ART

EP 0 676 374 A1 discloses a method and apparatus for tap water production using reverse osmosis and mentions the use of concentrate for regeneration of softeners, however along with technical restrictions.

SUMMARY OF THE INVENTION

In view of the above, an object of the invention resides in providing an apparatus and a method providing for reuse of water that is currently being finally drained, i.e. reuse of water that is hitherto going down the drain.

According to aspects of the present invention, this object is accomplished by a water treatment system as defined in the independent claims. Advantageous further developments of the invention are subject of the accompanying dependent claims.

A general idea underlying the present invention resides in singular or combined application or use of a variety of water processing procedures.

In a first procedure, the water from a wash back cycle of a carbon filter, i.e. water used for carbon back wash, is collected in a holding tank. This collected water is filtered and returned to the raw water tank through the filters according to a reuse requirement. The reverse osmosis discharge water is monitored to check concentration, and when the concentration is below a set level it is sent to the holding tank for reuse alongside the carbon backwash water.

In a second procedure, concentrate and/or grey water is used to regenerate charcoal filters. A certain amount of grey water from the drain of the reverse osmosis (RO) is used to regenerate a softener. The softener (i.e. ion exchanger) uses NaCl brine to remove Ca and Mg from the tap water. The softened water has already a higher load of Na that will be concentrated even higher by reverse osmosis. This concentrate can be used for creating NaCl brine for regeneration, and can potentially save a certain amount of NaCl pellets. Accordingly, not only water but also NaCl can be saved by using the second procedure.

In a third procedure, concentrate and/or grey water is used to flush a sand filter. Sand filters are configured to filter out physical contaminations of the tap water. They need to be backwashed on a regular basis to flush out contaminations and to loosen the sand bed. There are no requirements for the quality of the flushing fluid.

Advantageously, a system or apparatus and a method configured to employ any one, or any combination, of the afore-mentioned procedures allow for the reuse of a significant volume of water that would normally be sent to the drain, and therefore offers an ecological and financial benefit through the reuse of this water. Also, NaCl consumption can be reduced because a significant percentage of the NaCl is reused.

More specifically, according to an aspect of the present invention, there is provided a water treatment system, comprising a raw water tank connected to a water supply; a reverse osmosis unit arranged to produce purified water from water input from the raw water tank via a raw water supply line; at least one water treatment facility alongside said raw water supply line downstream said raw water tank and upstream said reverse osmosis unit; and a reuse water feedback line arranged to feed waste water and/or grey water collected from said reverse osmosis unit and/or said at least one water treatment facility back to the raw water tank for reuse.

Said at least one water treatment facility may include one or more of a water softening plant, an activated carbon filter with backwash facility and/or a sand filter, and may be configured to be connectable to the raw water supply line via a set of isolation valves allowing raw water to enter into the water treatment facility and to leave the water treatment facility.

Said water softening plant may be arranged to operate with NaCl brine.

Among plural water treatment facilities, only an activated carbon filter with backwash facility may be connected to said reuse water feedback line.

A water saving storage tank may be arranged as a waste water and grey water buffer in said reuse water feedback line, and said reuse water feedback line may be arranged to feed waste water and/or grey water collected from said reverse osmosis unit and/or said at least one water treatment facility into said water saving storage tank prior to feeding it back to the raw water tank for reuse.

A reuse water filter arranged to filter particle sizes of 5 μm or more may be arranged in said reuse water feedback line downstream said water saving storage tank.

As one of said at least one water treatment facility, at least one final water filter arranged to filter out particle sizes of 5 μm or more absolute may be arranged in a backwashable manner downstream said at least one water treatment facility and upstream said reverse osmosis unit.

At least one raw water filter arranged to filter out particle sizes of 20 μm or more may be arranged in a backwashable manner upstream said raw water tank.

At least one raw water pump and a pressure vessel may be arranged in said raw water supply line downstream said raw water tank and upstream said at least one water treatment facility; at least one reuse water pump and a strainer may be arranged in said reuse water feedback line; and a high level detector and a low level detector may be arranged at and connected to the reuse water feedback line feeding reuse water into the raw water tank, and a high level detector and a low level detector may be arranged at and connected to the raw water supply line feeding raw water into the raw water tank, and configured to output detection signals to be used in at least a raw water pump and reuse water pump control.

According to a further aspect of the present invention, there is provided a water treatment method in a water treatment system having a raw water tank connected to a water supply, a reverse osmosis unit arranged to produce purified water from water input from the raw water tank via a raw water supply line, and at least one water treatment facility alongside said raw water supply line downstream said raw water tank and upstream said reverse osmosis unit, comprising the step of feeding waste water and/or grey water collected from said reverse osmosis unit and/or said at least one water treatment facility back to the raw water tank for reuse.

As used herein, the devices, structures, configurations and/or components constituting the water treatment system described and referred to herein may be configured to provide a variety of modifications, including more or less preinstalled configurations and/or separate parts to be put in proper place and connected upon use and/or operation.

BRIEF DESCRIPTION OF THE DRAWING

The invention is best understood from the following detailed description when read in connection with the accompanying drawing. Included in the drawing is the following FIGURE.

DETAILED DESCRIPTION OF THE PREFERRED EMBODIMENTS

Figure 1:
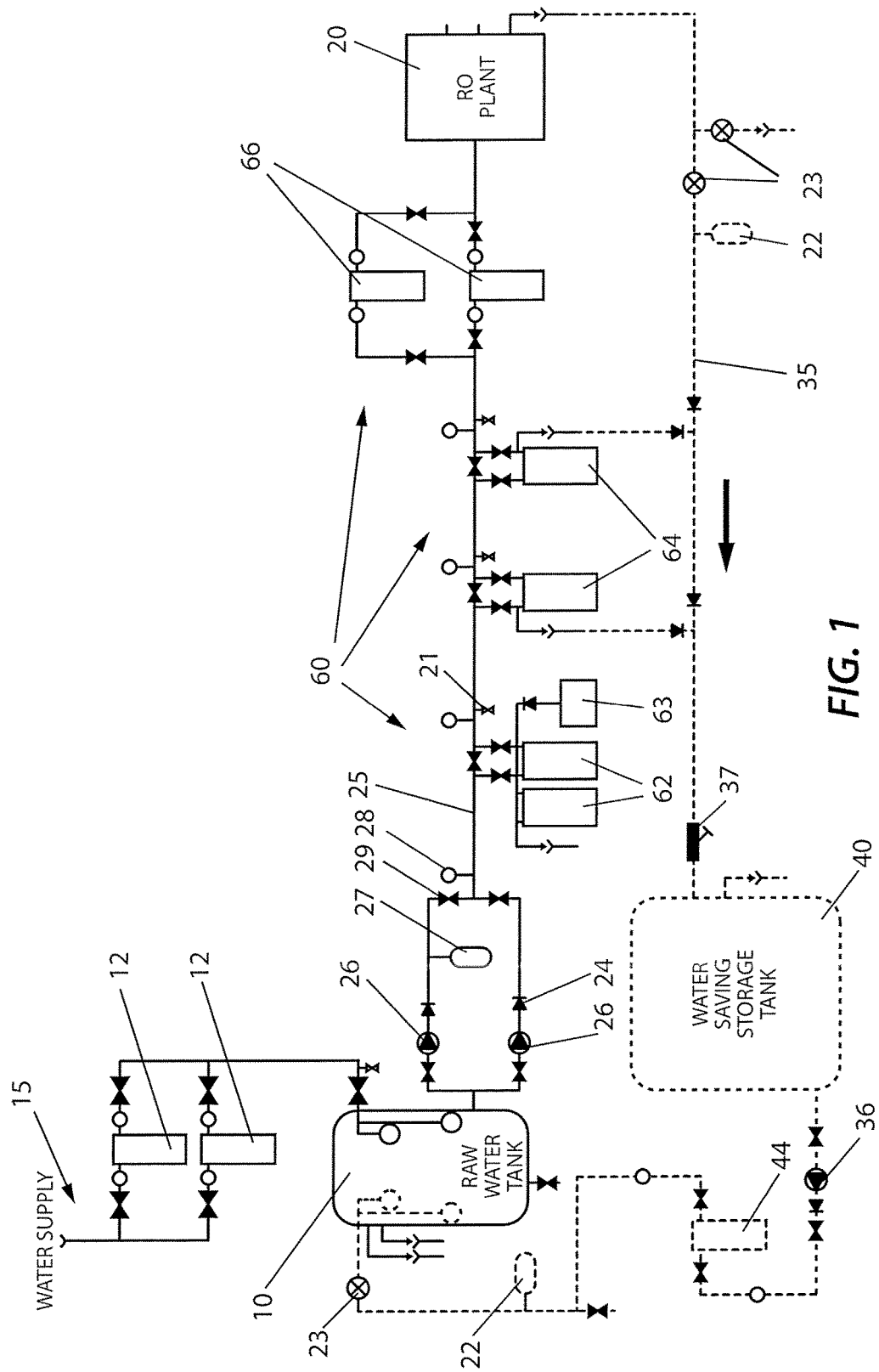
FIG. 1 shows schematically and simplified a structural diagram of a water treatment system scheme directed to water reusage according to an embodiment.

It is noted that similar or like parts visualized throughout the drawing and FIGURE may be denoted by like reference numerals, or not denoted by reference numerals at all, and details thereof will not be described or explained redundantly. It is further noted that throughout the drawing and FIGURE, sections and/or components without immediate significance toward describing the invention may be omitted or hidden in order to provide an improved vision of more important parts of the scheme.

As shown in FIG. 1, a water treatment system according to an embodiment includes a raw water tank 10 connected to a water supply 15 supplying tap or raw water to the system, a reverse osmosis plant or unit 20 arranged to produce purified water from water supplied from the raw water tank 10 via a raw water supply line 25, at least one water treatment facility 60 alongside the raw water supply line 25 downstream the raw water tank 10 and upstream the reverse osmosis plant 20, and a reuse water feedback line 35 arranged to feed waste water and/or grey water collected from the reverse osmosis plant 20 and/or the at least one water treatment facility 60 back to the raw water tank 10 for reuse. In a water treatment method in such a water treatment system, waste water and/or grey water collected from the reverse osmosis plant 20 and/or the at least one water treatment facility 60 is fed back to the raw water tank 10 for reuse.

In the present embodiment, at least one first pump 26 is provided in the raw water supply line 25 downstream of the raw water tank 10 and arranged to convey a required amount of raw water out of the raw water tank 10 through the raw water supply line 25 toward the reverse osmosis plant 20. It may be preferable that two pumps 26 are provided in parallel pump mounting branches of the raw water supply line 25, and that a pressure vessel 27 is installed in at least one of the parallel pump mounting branches.

Similar thereto, a second pump 36 is provided in the reuse water feedback line 35 downstream a water saving storage tank 40 and arranged to convey a required amount of waste and/or grey water stored in the water saving storage tank 40 out of the water saving storage tank 40 toward the raw water tank 10.

A predetermined number of pressure gauges 28, respectively indicated by round circles filled white along the fluid paths in FIG. 1, may be distributed in the water treatment system at respective predetermined locations in order to detect fluid pressure where required.

Also, a predetermined number of manually and/or automatically controllable isolation valves 29, respectively indicated by solid black double triangles facing each other in FIG. 1, and check valves 24, respectively indicated by solid black single bar triangles in FIG. 1, may be arranged in the water treatment system at respective predetermined locations in the fluid paths in order to allow for opening and closing a fluid path where required, or to prevent fluid from flowing back behind a predetermined position (the position of the check valve 24), and thus to control and direct, and allow or prevent fluid (water) flow, as required.

As shown in FIG. 1, a predetermined configuration of isolation valves 29 are provided at connection points of the at least one water treatment facility 60 along the raw water supply line 25 in such a manner that the raw water supply line 25 may be closed, or at least partially closed, between an input to a water treatment facility 60 and an output thereof so as to force all or part of the raw water flowing toward the reverse osmosis plant 20 to enter into the water treatment facility. Of course, the isolation valve 29 configuration can also be set to prevent fluid from entering into the water treatment facility so as to completely bypass the same, for example when its function is not needed or when some maintenance is required.

In other words, the isolation valve 29 configuration at device entry or fluid path branch points may be arranged to operate as a controllable multiway valve adapted to selectably connect or disconnect multiple fluid paths.

In addition, the water treatment system according to the embodiment is provided with a predetermined number of fluid drains, indicated by an arrow and sink symbol in FIG. 1, which mainly serve to finally drain any surplus or overflowing fluid and water, e.g. to send waste water to drain, respectively, a predetermined number of sample points 21, indicated by smaller double triangles facing each other in FIG. 1, and conductivity probe points 22 provided to allow for probing or sampling the process fluid where necessary, a predetermined number of solenoid valves 23 arranged for enhanced fluid control.

The water treatment system according to the embodiment may be virtually subdivided in two sections. A first section, shown by solid lines in FIG. 1, may represent the raw or tap water supply from water supply 15 via the raw water tank 10 and the raw water supply line 25 and, as the case may be, the at least one water treatment facility (or unit, device or station) 60 to the reverse osmosis plant 20. A second section, shown by dashed lines in FIG. 1, may represent the waste and/or grey water reuse feedback path starting at the reverse osmosis plant 20 and collecting waste and/or grey water from the reverse osmosis plant 20 and the at least one water treatment facility 60 along the reuse water feedback line 35 and feeding the collected reuse fluid or water via the water saving storage tank 40, serving as a buffer, back to the raw water tank 10. A strainer 37 may be inserted into the reuse water feedback line 35 upstream the water saving storage tank 40.

In the present embodiment, at least one water treatment facility 60 includes for example a duplex water softening plant 62, two activated carbon filters 64 with backwash facility and two sand filters 66. Each of these facilities, or devices, is connectable to the raw water supply line 25 via a respective set of isolation valves 29 as mentioned above, allowing raw water to enter into each of the water treatment facility and to leave the water treatment facility after treatment thereat.

In the present embodiment, the duplex water softening plant 62 is arranged to operate with NaCl brine from a solute reservoir 63. The NaCl brine may be prepared in situ using NaCl pellets, or be otherwise filled into the solute reservoir 63.

In the duplex water softening plant 62, the present embodiment features the use of grey water, or a certain amount of grey water, fed back from the reverse osmosis drain to regenerate the softener. The achieved effect is significant because the softener (an ion exchanger) uses NaCl brine to remove Ca and Mg from the tap water. The softened water has already a higher load of Na which will be concentrated even higher by the reverse osmosis. This concentrate can be used for creating NaCl brine for regeneration. When doing so there is also a potential of saving a certain amount of NaCl pellets, and accordingly, not only water but also NaCl can advantageously be saved.

In addition, in the activated carbon filters 64, the present embodiment features collecting water from the wash back cycle of the carbon filters. Carbon filters are used to adsorb chlorine and other ions, and consist of an active filter granulate that needs backwashing in order to loosen the granulate structure. The water used for backwashing the carbon filters is not overloaded with additional substances and, thus, reusable, and this water is therefore filtered and sent back to the raw water tank 10. As shown in FIG. 1, only the activated carbon filters with backwash facility are connected to the reuse water feedback line 35 in order to collect the backwash water.

As another water treatment facility 60 in the present embodiment, one or more sand filters 66 are arranged and provided in a backwashable manner upstream the reverse osmosis plant 20 as a final water filter arranged to filter out particle sizes of 5 μm or more absolute. Sand filters are designed to filter out physical contaminations from the tap water and need to be backwashed on a regular basis to flush out any contaminations and to loosen the sand bed. As there are no particular requirements for the flushing fluid quality, the reused water can be used for the filter flushing process.

The water saving storage tank 40 is arranged as a waste water (e.g. from the reverse osmosis plant 20) and grey water (e.g. from the reverse osmosis plant and/or the carbon filters 64) buffer in the reuse water feedback line 35, and the reuse water feedback line is arranged to feed the waste water and/or grey water collected from said reverse osmosis plant 20 and/or the at least one water treatment facility 60 into the water saving storage tank 40.

Prior to feeding the water collected in the water saving storage tank back to the raw water tank 10 for reuse, a reuse water filter 44 arranged to e.g. filter particle sizes of 5 μm or more is arranged in the reuse water feedback line 35 downstream the water saving storage tank 40.

The water treatment system according to the present embodiment can be equipped with at least one backwashable raw water filter 12 arranged to filter out particle sizes of 20 μm or more. This raw water filter 12 can be placed upstream the raw water tank 10.

As there may be considerable inflow into the raw water tank 10, the raw water tank 10 may be equipped with a high fluid level detector and a low fluid level detector arranged at and connected to the reuse water feedback line 35 that feeds the reusable water into the raw water tank 10, and further equipped with a high fluid level detector and a low fluid level detector arranged at and connected to the raw water supply line feeding raw water into the raw water tank 10. These detectors, which may also be sensors, switches and the like, may be configured to output detection signals to be used in e.g. a raw water pump 26 and/or reuse water pump 36 control, and/or inlet valve control. Providing two separate detector circuits is advantageous in that respective control may be carried out independently.

As has been described above, the system and the method according to aspects of the present invention allow for the reuse of a significant volume of water which is hitherto sent to drain, and therefore achieves a significant ecological and financial benefit through the reuse of this water. As well, a significant reduction of NaCl consumption is achieved because a remarkable percentage of NaCl is reused.

Although specific amounts such as weight, absolute length, width and thickness, coloring, form and minor details are not shown, such specifications are within the purview of the invention described herein above as will be understood to those skilled in the art. It is also to be understood that the specific text, sequence and content of configurations and components shown in the drawing and described herein are by way of illustration and example only and the apparatus, system and operation thereof are not to be limited thereby.

Therefore and as understood, the invention is not limited to the described preferred embodiment and modifications thereof, and combinations of at least parts of the embodiment, modifications and equivalents all within the scope defined by the appended claims may occur to the skilled person.

The invention claimed is:

1. A water treatment system, comprising:
    A raw water tank for connection to a water supply;
    A reverse osmosis unit arranged to produce purified water from water received from the raw water tank via a raw water supply line;
    At least one water treatment facility alongside said raw water supply line downstream of said raw water tank and upstream of said reverse osmosis unit, said at least one water treatment facility including at least one of a water softening plant, an activated carbon filter with backwash facility having a washback cycle, or a sand filter; and
    A reuse water feedback line arranged to feed, according to a reuse requirement,
    a) grey water collected as reverse osmosis discharge water from said reverse osmosis unit when concentration of said reverse osmosis discharge water is below a set level, and
    b) water collected from the washback cycle of said activated carbon filter, back to the raw water tank for reuse in regenerating a softener in said water softening plant, backwashing said activated carbon filter, or flushing said sand filter.

2. The water treatment system according to claim 1, further comprising:
    a set of isolation valves allowing raw water to enter into the water treatment facility and to leave the water treatment facility, wherein said at least one water treatment facility including said at least one water softening plant, activated carbon filter with backwash facility having the washback cycle, or sand filter is configured to be connectable to the raw water supply line via the set of isolation valves.

3. The water treatment system according to claim 2, wherein said water softening plant is configured to operate with NaCl brine.

4. The water treatment system according to claim 2, wherein only said activated carbon filter with backwash facility is connected to said reuse water feedback line.

5. The water treatment system according to claim 1, further comprising:
    a water saving storage tank arranged as a grey water buffer in said reuse water feedback line, said reuse water feedback line arranged to feed grey water collected from at least one of said reverse osmosis unit or said at least one water treatment facility into said water saving storage tank prior to feeding the collected grey water back to the raw water tank for reuse.

6. The water treatment system according to claim 5, further comprising:
    a reuse water filter configured to filter particle sizes of 5 µm or more arranged in said reuse water feedback line downstream of said water saving storage tank.

7. The water treatment system according to claim 1, wherein the at least one water treatment facility includes at least one sand filter arranged to filter out particle sizes of 5 µm or more absolute arranged in a backwashable manner downstream of said at least one water treatment facility and upstream of said reverse osmosis unit.

8. The water treatment system according to claim 1, further comprising:
    at least one raw water filter configured to filter out particle sizes of 20 µm or more arranged in a backwashable manner upstream of said raw water tank.

9. The water treatment system according to claim 1, further comprising:
    at least one raw water pump and a pressure vessel arranged in said raw water supply line downstream of said raw water tank and upstream of said at least one water treatment facility;
    at least one reuse water pump and a strainer arranged in said reuse water feedback line; and
    a first high fluid level detector and a first low fluid level detector arranged at and connected to the reuse water feedback line feeding reuse water into the raw water tank, and
    a second high fluid level detector and a second low fluid level detector arranged at and connected to the raw water supply line feeding raw water into the raw water tank
    wherein the first high fluid level detector, the first low fluid level detector, the second high fluid level detector, and the second low fluid level detector are configured to output detection signals for use in controlling the at least one raw water pump.

10. The water treatment system according to claim 9, wherein said first and second high and low fluid level detectors are configured as at least one of sensors or switches in two separate detector circuits and are configured to output the detection signals of said two separate detector circuits, and said water treatment system is configured to control at least one of an independent raw water pump, a reuse water pumpol, or an inlet valve based on said detection signals.

11. A water treatment method in a water treatment system having a raw water tank connected to a water supply, a reverse osmosis unit arranged to produce purified water from water input from the raw water tank via a raw water supply line, and at least one water treatment facility alongside said raw water supply line downstream of said raw water tank and upstream of said reverse osmosis unit, said at least one water treatment facility including at least one of a water softening plant, an activated carbon filter with backwash facility having a washback cycle, or a sand filter, the method comprising the step of
    feeding, according to a reuse requirement,
    a) grey water collected as reverse osmosis discharge water from said reverse osmosis unit when concentration of said reverse osmosis discharge water is below a set level, and
    b) water collected from the washback cycle of said activated carbon filter,
    back to the raw water tank for reuse in regenerating a softener in said water softening plant, backwashing said activated carbon filter, or flushing said sand filter.

* * * * *